Oct. 25, 1932.  A. G. KERR  1,883,936
AGITATING AND DUMPING VEHICLE BODY
Filed Aug. 12, 1929

Inventor
Arthur G. Kerr
By Liverance and
Van Antwerp
Attorneys

Patented Oct. 25, 1932

1,883,936

UNITED STATES PATENT OFFICE

ARTHUR G. KERR, OF DETROIT, MICHIGAN, ASSIGNOR TO WOOD HYDRAULIC HOIST & BODY COMPANY, OF DETROIT, MICHIGAN, A CORPORATION OF MICHIGAN

AGITATING AND DUMPING VEHICLE BODY

Application filed August 12, 1929. Serial No. 385,359.

This invention relates to a novel construction of dumping body combined with a truck chassis frame, particularly useful for transporting and dumping cementitious mixtures. It is now common practice to mix cementitious mixtures of any suitable aggregate with cement and water and carry the same from the mixing plant to the place where the mixture is to be poured into forms. The principal trouble with respect to this process of producing and transporting a cementitious mixture is that the Portland cement is very liable to segregate from the aggregate and settle to the bottom of the mass filling in any corners and cracks in the body, catching on any seams and setting and hardening in place and, with the additional loads which are carried, there is a continual increase of the amount deposited. Dumping the cementitious mixture has been difficult so far as getting all of the mixture out of the body without leaving some of it adhering to the bottom.

Attempts have been made previously to solve this problem as shown in the prior application for patent of Kerr and Merchant, Serial No. 237,658, filed December 3, 1927, and a long step in the proper direction was taken with a body constructed as shown in said application. However, such construction did not completely solve the problem, particularly at the front end of the body at which cement was liable to settle, collect and harden though this was attempted to be overcome by a fabric member against which the cementitious mixture was to settle at the front end of the body. The fabric member is difficult to maintain in proper condition and has proved more or less impractical.

In the present invention, a body is constructed for use in transporting and dumping wet cementitious mixtures, and with it the segregation heretofore occuring is eliminated to a very large degree and there is no collecting of either the cement or mixture at the bottom of the body and retaining thereof for other additional deposits to adhere to, all seams, cracks and the like being completely eliminated.

The invention is fully described in the following description taken in connection with the accompanying drawing, in which, Fig. 1 is a longitudinal vertical section through the body in horizontal position and illustrating the pivotal mounting thereof on its truck chassis.

Like reference characters refer to like parts in the different figures of the drawing.

Figure 1:
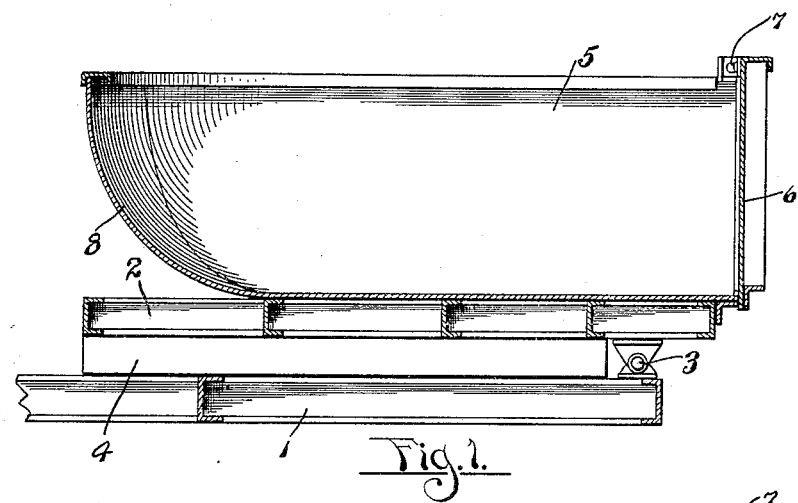
Figure 2:
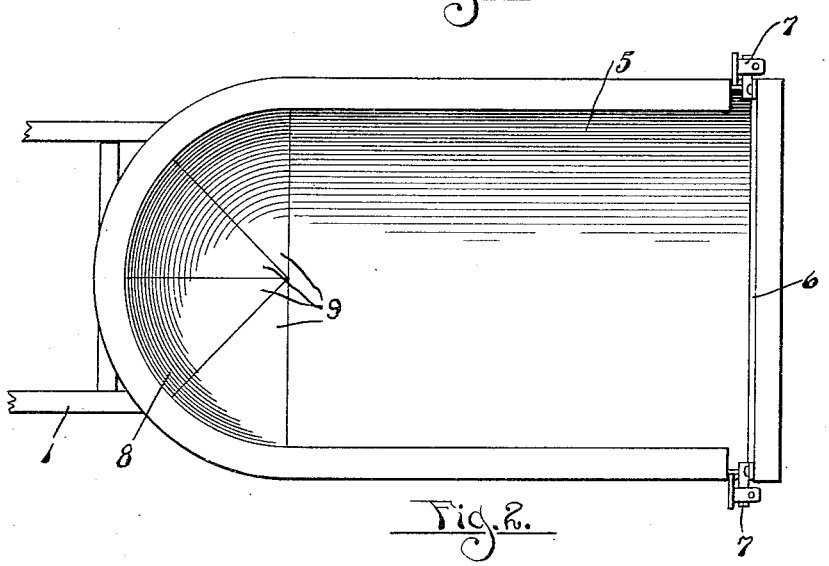
Fig. 2 is a plan view thereof.
Figure 3:
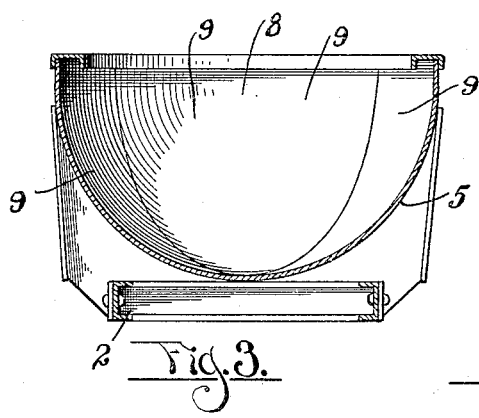
Fig. 3 is a transverse vertical section through the body and under frame to which it is permanently secured.

The truck chassis frame on which the body is mounted is indicated at 1, above which is an under frame 2 made up of side members and cross bars connecting the same. It is pivotally connected at 3 to the rear portion of the chassis frame, the space which is required for the pivot brackets connected to the chassis frame and the under frame being filled by filler 4 carried by the chassis frame against which the under frame 2 of the body may rest when the body is in horizontal position.

The body 5 is located above and carried by the under frame 2. It is of sheet metal shaped substantially in semi-cylindrical form lengthwise thereof from its rear end forward for the major portion of its length. The rear end is open but adapted to be closed by a suitable tail gate 6 pivotally mounted on the body on trunnions 7 adjacent its upper edge. The tail gate may be latched in closed position to keep material carried in the body from escaping until the gate is unlatched and the body tilted about the pivots 3 to an upper inclined position. At the front end, the body is formed into the shape substantially of a quadrant of a sphere, as indicated at 8. In practice this sector of spherical shape may be made from a plurality of segments 9 properly shaped having their edges abutting and likewise abutting with the front end of the sheet of metal from which the rear portion of the body is formed, and the parts butt welded together at their contacting edges. This provides a completely smooth inner surface to the body against which cementitious material placed therein bears and no seams or cracks appear against which cement separating from the mixture may come and eventually set so as to provide ridges against which other cement may collect.

The body of course is provided with a suitable upper border of metal which, however, is of no concern in the present invention.

A tiltable body for dumping trucks, as described, of semi-circular cross section at the rear portion and shaped as a quadrant of a sphere at the front has proven completely and exceptionally satisfactory to carry a load of wet mixed concrete without segregation of the materials of the mixture, there being an agitation set up as the truck is moved over the streets or roads so that at the end of a trip the mixture is substantially homogeneous with no appreciable segregation of the cement from the mixture and with little or no deposit of the finer particles of the mixture. Furthermore, on tilting the body upward when its contents is to be dumped, the force of gravity operating on the mixture causes that at the front spherical shaped end of the body to scour the inner sides of the body and remove any minor amount of sediment which may have deposited. The transportation of a wet cementitious mixture over considerable distance is readily and easily accomplished and its complete solution has been by the use of a tiltably mounted dumping body of the construction described.

The invention is defined in the appended claim and is to be considered comprehensive of all forms of structure coming within its scope.

I claim:

In a construction of the class described, a semi-cylindrical horizontal elongated body member, said body including a front end portion curved upwardly into the shape of a quadrant of a sphere and a gate adapted to close the rear end portion of the said body member.

In testimony whereof I affix my signature.

ARTHUR G. KERR.